May 5, 1953  G. F. WATSON  2,637,115
MAGNETIC CALIPERING DEVICE
Filed April 3, 1950
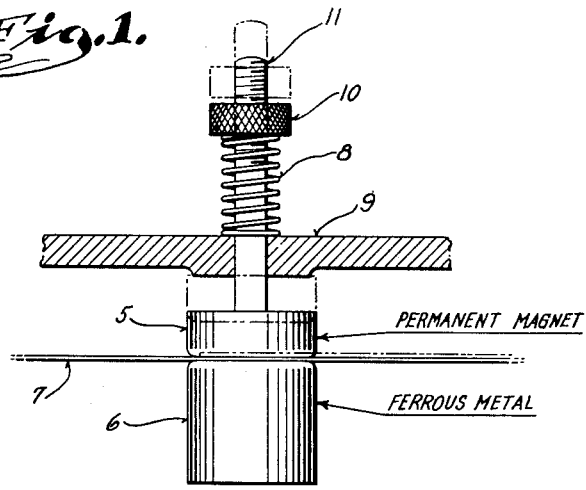
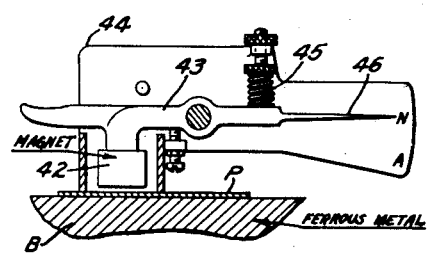
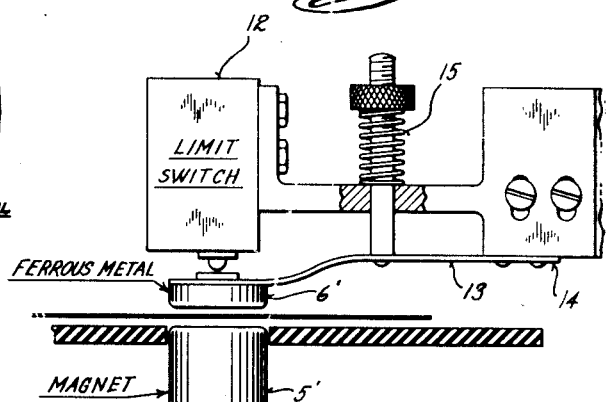
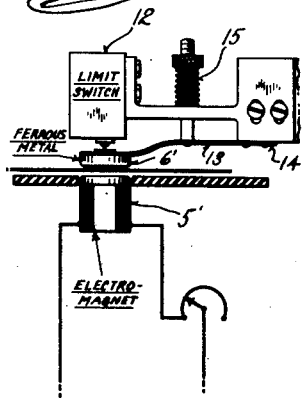
Inventor
George F. Watson Patented May 5, 1953

2,637,115

UNITED STATES PATENT OFFICE 2,637,115

MAGNETIC CALIPERING DEVICE

George F. Watson, Racine, Wis., assignor to The Christensen Machine Company, Racine, Wis., a corporation of Wisconsin Application April 3, 1950, Serial No. 153,520

3 Claims. (Cl. 33—174)

This invention relates to calipers and refers more particularly to magnetic calipering devices designed to detect an abnormal condition capable of imparting movement to a feeler, as for instance, an excess thickness of sheet material being fed to a machine, or variations in the thickness of plating.

It is recognized that the broad concept of utilizing a magnet in connection with a sheet detector is old, having been disclosed in Patent No. 2,433,120, issued December 23, 1947, to C. W. Harrold. However, as far as known magnets have not been used in the past to trigger a relatively strong force capable of producing a considerably magnified motion.

The purpose of this invention thus is to provide a caliper or calipering device wherein the magnetic force of a magnet couple normally overpowers the force of a spring or other motion producing device to restrain the same and thereby prevent actuation of the mechanism which is operated by the spring or other motion producing device as long as a predetermined normal condition obtains under a feeler, but to effect release of the force of the spring or other motion producing device upon a reduction in the magnetic force brought about by a very slight separation of the elements of the magnet couple.

Hence it is possible with this invention to not only magnify the slight motion produced by response of a feeler to the abnormal condition to be detected, but to also release a strong force with a snap action.

With the above and other objects in view, which will appear as the description proceeds, this invention resides in the novel construction, combination and arrangement of parts substantially as hereinafter described and more particularly defined by the appended claims, it being understood that such changes in the precise embodiments of the hereindisclosed invention may be made as come within the scope of the claims.

The accompanying drawings illustrate several complete examples of the physical embodiment of the invention constructed according to the best modes so far devised for the practical application of the principles thereof, and in which:

Figure 1 is a side view of a simple caliper for sheet material embodying the principles of this invention;

Figure 2 is a side view of a caliper constructed in accordance with this invention and designed to actuate a switch upon tripping;

Figure 3 is a view similar to Figure 2 but illustrating the use of an electromagnet in place of a permanent magnet; and Figure 4 is a view partially in side elevation and partially in section illustrating an adaptation of this invention to a gauge for detecting abnormal thickness of plating or the like.

Referring now more particularly to the accompanying drawings it will be seen that although the invention has been illustrated in a number of different embodiments, in all instances a magnet couple is provided and the magnetic attraction between the elements thereof is opposed by a spring so that upon separation of the elements of the magnet couple—produced one way or another—beyond a predetermined distance the spring overpowers the magnetic attraction between the elements of the couple and trips the mechanism being controlled. The spring provides a strong force capable of producing a large motion in consequence to a very slight movement apart of the elements of the magnet couple.

In the simple embodiment of the invention illustrated in Figure 1 where the elements of the magnet couple comprise a permanent magnet 5 and an armature member 6, the opposing faces of these elements constitute feelers between which the work 7 being calipered passes. The elements of the magnet couple are thus held apart by the work 7 which, of course, must be of nonmagnetic material, and as long as the thickness of the work 7 does not exceed the critical maximum for which the device is set, the magnetic attraction between the elements 5 and 6 overpowers the force of a spring 8 urging the elements apart.

The spring is confined between the top of a fixed wall 9 and the underside of an adjusting screw 10 threaded onto a stem 11 which passes slidably through the wall 9 to mount the movable element of the magnet couple which in this case is the magnet 5. Adjustment of the tension of the spring 8 by the screw 10 affords means for changing the critical spacing of the elements of the magnet couple to adapt the device to different work. Obviously, of course, the permanent magnet may be the stationary element of the magnet couple and the armature may be the movable element thereof.

In the embodiment of the invention shown in Figure 1 the spring produced upward projection of the magnet 5 and its stem 11 upon tripping of the device of itself constitutes an indication of the detection of an abnormal condition between the feelers, occasioned in this instance by an excess thickness of the work, or as indicated in dotted lines by more than one lamination.

The spring produced motion of the magnet and its stem, however, could be utilized to actuate control instrumentalities as for instance a switch 12 as in the embodiment of the invention shown in Figures 2 and 3 where the spring produced motion of the movable element of the magnet couple actuates a switch 12. In both of these embodiments the magnet couple comprises a fixed magnet 5′, which in Figure 3 is an electromagnet, and a movable armature element 6'. This movable armature element is mounted on the outer end of a resilient arm 13 anchored as at 14 and yieldingly urged upward by a spring 15.

The spring 15 is opposed by the magnetic attraction between the elements of the magnet couple, and the forces are so balanced that a predetermined spacing is maintained between the elements of the couple as long as the work passing therebetween does not reduce the attraction between the elements of the magnet couple byond the critical value for which the device is set. Upon interpositioning a substance between the elements of the magnet couple which does result in such a reduction of the magnetic attraction, the spring 15 overpowers the magnet and trips the switch 12.

Another embodiment of this invention is illustrated in Figure 4. In this case the purpose of the device is to enable checking the thickness of a nonmagnetic plating P or the like upon a magnetic metal base B. The base thus constitutes the stationary element of the magnet couple, the movable element being a permanent magnet 42 carried by a lever 43 pivoted between the parallel walls of a supporting frame 44 and yieldingly urged in a clockwise direction about its pivot by a spring 45. The attraction of the magnet 42 for the base B opposes the force of the spring and holds the lever 43 and an indicator 46 extending therefrom in a normal position indicated by the letter N upon the scale which cooperates with the pointer. An excess thickness of plating increases the space between the magnet and the base B and thus trips the caliper as will be readily apparent. Obviously, of course, the device is portable and may be used as a gauge to quickly determine whether a nonmagnetic plating or nonmagnetic sheet overlying a magnetic base exceeds a predetermined thickness.

From the foregoing description taken in connection with the accompanying drawings it will be readily apparent to those skilled in this art that this invention provides a calipering device which, since it enables the transformation of a minute movement into a greatly magnified motion taking place with a snap action and considerable force, possesses many advantages over calipering devices heretofore available.

What I claim as my invention is:

1. In a magnetic caliper for non-magnetic material, a magnet couple comprising an electromagnetized element and an armature element magnetically attracted toward one another, said elements having feeler surfaces engaging directly opposed faces of the material being calipered, said engagement being effected by the magnetic attraction of said elements, and one of said elements being movable toward and away from the other, support means for said elements, biasing means operably connected with and continuously applying a yieldable force upon the movable element, said force being applied in a direction tending to further separate said elements and to disengage said movable element from said material, the biasing force and the force of magnetic attraction being so proportioned that the movable element is held in engagement with the surface of said material as long as the thickness of the material interposed between said feeler surfaces is less than a critical distance at which the biasing force overpowers the force of magnetic attraction between the elements and said movable element is moved out of engagement with the material when material having a thickness at least as great as said critical distance is interposed between said feeler surfaces.

2. In a magnetic caliper: a magnet couple consisting of an electro-magnet element and an armature element mutually attracted toward one another, one of said elements being movable toward and from the other; a spring applying a force upon the movable element in a direction tending to separate the elements of the magnet couple; said elements of the magnet couple having feeler surfaces drawn toward each other by the magnetic attraction between said elements and between which work to be calipered may be passed, said elements engaging opposite faces of said work and being held by magnetic attraction against spring propelled separation beyond the thickness of said work as long as the spacing between their said feeler surfaces remains less than a critical distance at which the magnetic attraction between the elements overpowers the spring so that the interpositioning of work having a thickness at least as great as said critical distance for which the caliper is set will cause said spring to overcome said magnetic attraction permitting said movable element to be moved out of engagement with the work by the spring.

3. In a magnetic caliper of the character described: a magnet couple comprising an electromagnet having a work engaging surface and a block of magnetic material having a complementary work engaging surface; means mounting said elements of the magnet couple in opposed relation with their work engaging surfaces facing each other so that the magnetic attraction between the magnet and the block tends to draw their work engaging surfaces together, one of said elements being movable toward and from the other; biasing means acting upon said movable element and at all times urging the same away from the other element to thus separate their work engaging surfaces; and instrumentalities actuated by movement of the movable element produced by the biasing means so that whenever work to be calipered is passed between said elements with opposite faces of the work engaged by the work engaging surfaces of said elements of the magnet couple which reduces their mutual magnetic attraction by increasing the spacing therebetween to the point where the biasing means overpowers the magnetic attraction, said instrumentalities will be actuated in response to movement of said movable element by said biasing means.

GEORGE F. WATSON.

References Cited in the file of this patent

UNITED STATES PATENTS

| Number | Name | Date |
|---|---|---|
| 511,866 | Slangerup | Jan. 2, 1894 |
| 692,217 | Sundh | Jan. 20, 1902 |
| 1,077,818 | Eagar | Nov. 4, 1913 |
| 2,170,341 | Shaw | Aug. 22, 1939 |
| 2,179,517 | Pelosi | Nov. 14, 1939 |
| 2,260,771 | Buccicone et al. | Oct. 28, 1941 |
| 2,337,001 | Ray | Dec. 14, 1943 |
| 2,384,529 | Breitenstein | Sept. 11, 1945 |
| 2,442,170 | Heintz | May 25, 1948 |
| 2,475,819 | Coake | July 12, 1949 |
| 2,579,922 | Goldsworthy | Dec. 25, 1951 |